UNITED STATES PATENT OFFICE.

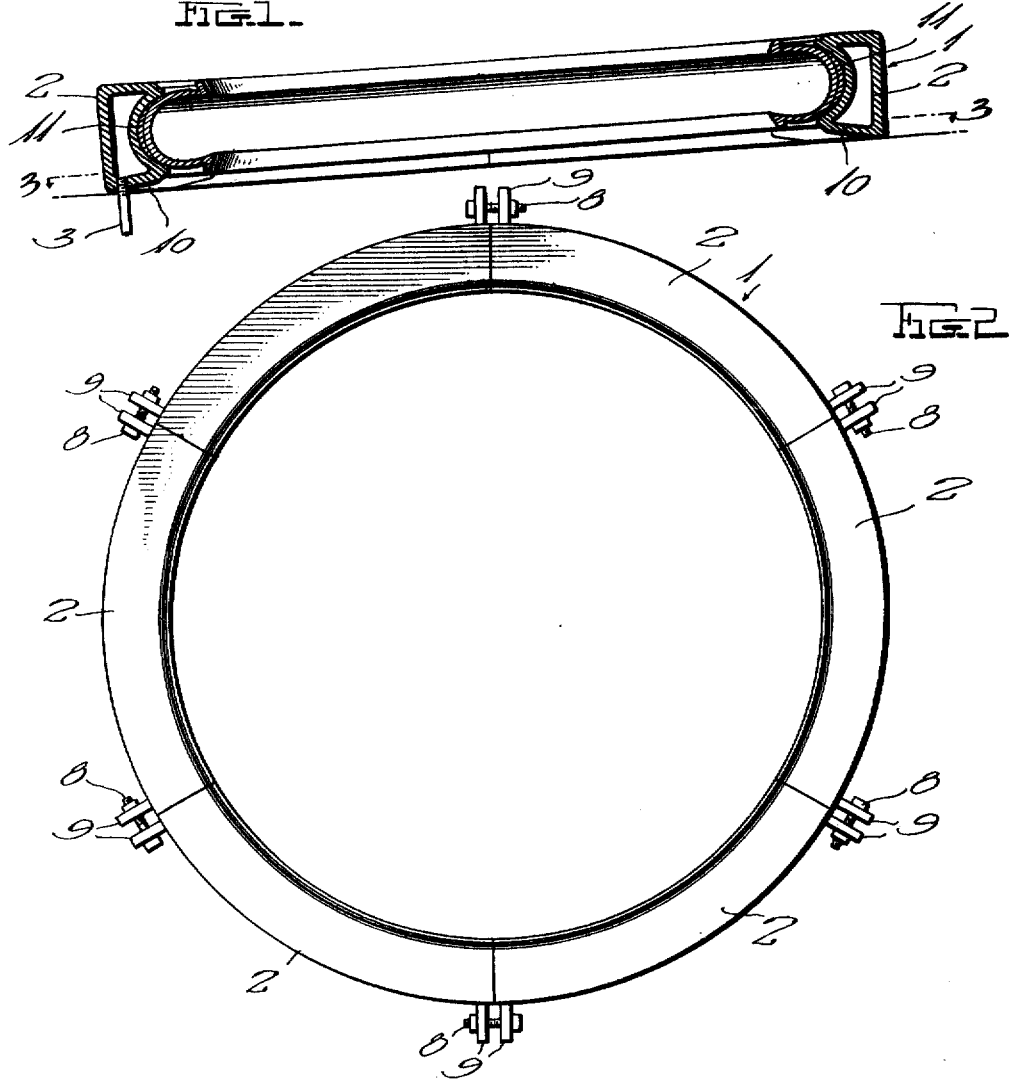
F. E. ANDERSON AND D. S. ERICKSON.
VULCANIZING MOLD FOR TIRE CASINGS.
APPLICATION FILED MAY 27, 1918.
1,317,904. Patented Oct. 7, 1919.
2 SHEETS—SHEET 1.
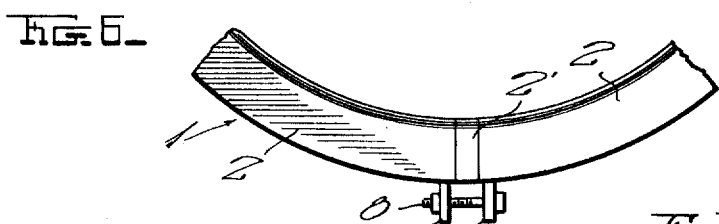
Witness
H. Woodard
Inventors
F. E. Anderson
& D. S. Erickson
By H. R. Wilson &co
Attorneys

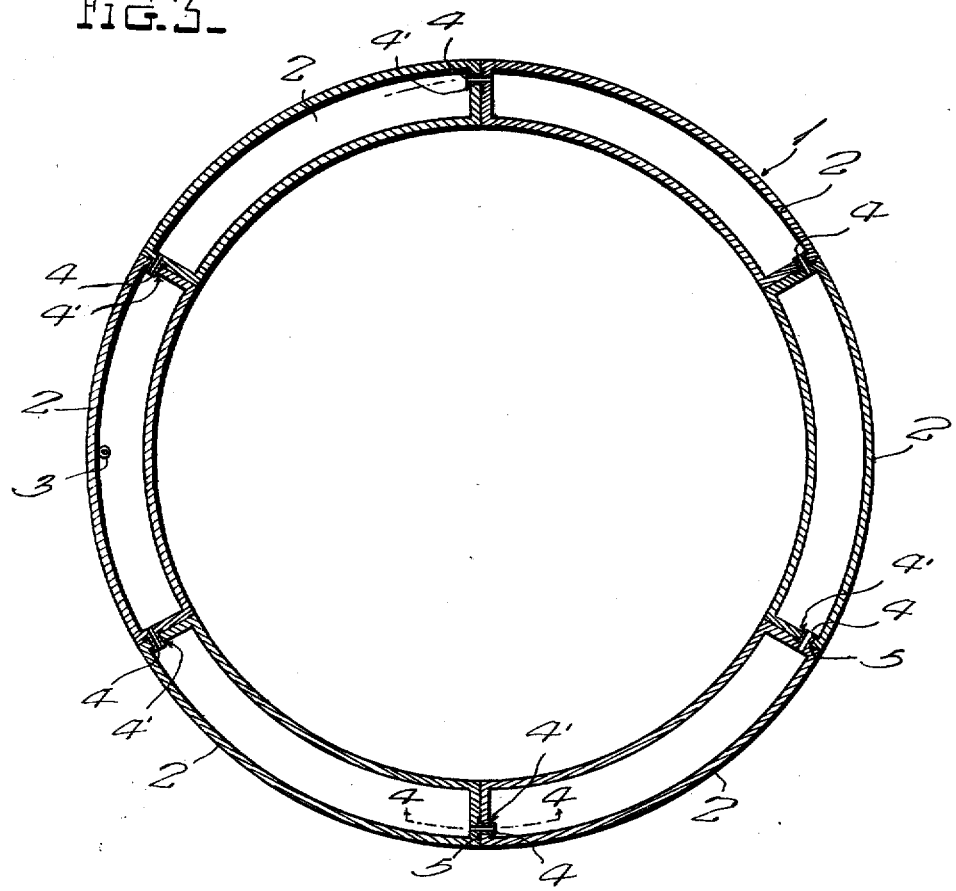

FRED E. ANDERSON AND DAVID S. ERICKSON, OF OSAGE, KANSAS; SAID ANDERSON ASSIGNOR TO SAID ERICKSON.

VULCANIZING-MOLD FOR TIRE-CASINGS.

1,317,904.      Specification of Letters Patent.      Patented Oct. 7, 1919.

Application filed May 27, 1918. Serial No. 236,845.

*To all whom it may concern:*

Be it known that we, FRED E. ANDERSON and DAVID S. ERICKSON, citizens of the United States, residing at Osage, in the county of Osage and State of Kansas, have invented certain new and useful Improvements in Vulcanizing-Molds for Tire-Casings; and we do declare the following to be a full, clear, and exact description of the invention, such as will enable others skilled in the art to which it appertains to make and use the same.

The present invention relates to improvements in vulcanizing molds for tire casings and more particularly to those intended for retreading old tires.

One object of the invention is to provide a complete annular mold formed in sections secured together so that the entire circumference of the tread may be vulcanized to the casing at a single operation, thus effecting a great saving in time over the present methods which usually employ arcuate molds and vulcanize only a portion of the circumference at a time.

A further object is to provide novel means for supplying steam or other heating medium to the several sections of the mold, and a still further object is to provide for directing any water of condensation away from the channel of the mold which receives the tread portion of the tire, the arrangement being such as to return this water to the source of steam or the like.

With the foregoing objects in view, the invention resides in the novel structure of the mold as hereinafter fully described and claimed, the descriptive matter being supplemented by the accompanying drawing forming a part of this specification and in which:

Figure 1 is a vertical transverse section of the mold showing a tire in place therein;

Fig. 2 is a side elevation of the mold;

Fig. 3 is a circumferential section on the plane of the line 3—3 of Fig. 1;

Fig. 4 is a detail circumferential section on the plane of the line 4—4 of Fig. 3, showing more particularly the connection between each pair of adjacent sections;

Fig. 5 is a perspective view of the meeting ends of two of the sections; and Fig. 6 is a small fragmentary side elevation showing one of the diameter increasing blocks applied.

In the drawings above briefly described, the numeral 1 designates the mold as a whole, said mold consisting of a ring formed of a plurality of hollow arcuate sections 2 disposed end to end in abutting relation, a pipe 3 being provided for supplying steam or the like to one of the sections 2, while nipples 4 establish communication between the several sections so that the steam may circulate therethrough to heat the molds sufficiently to perform the vulcanizing operation. The nipples 4 are carried fixedly by one end of the sections 2 and are removably received in openings 4' in the adjacent end of the next section, gaskets 5 being provided around the inner ends of said nipples to prevent the escape of steam. In addition to the connecting means afforded by the nipples the several sections 2 are preferably provided with dowel pins 6 receivable in sockets 7, said dowel pins and the nipples being held in the sockets 7 and openings 4' respectively, by means of bolts 8 which pass through lateral lugs 9 formed on the meeting ends of the sections. When these bolts are tightened, steam tight connections are formed between the sections 2, and by removing the bolts, it will be obvious that the sections may be quickly and easily detached.

The mold is adapted to be used in a slightly inclined position as shown clearly in Fig. 1, and it will be observed that the lower sides 10 of the several sections 2 incline downwardly away from the channel 11 formed in the inner side of the mold to receive the tread portion of the tire casing and the new tread to be vulcanized in place. By thus inclining the lower side of the mold, positioning the steam supply pipe 3 at the lowest point, and locating the nipples 4 directly above the inclined sides 10, all water of condensation will trickle downwardly away from the channel 11 and will flow by gravity to the boiler or the like, by way of the pipe 3. The efficiency of the device is thus much greater than would be possible if the water of condensation were permitted to collect in proximity to the channel 11, since such accumulated water forms more or less of an insulator to decrease the temperature of the device.

When the mold is to be used upon the smallest sized tire for which it is designed, the sections 2 are clamped tightly together as above pointed out, but by inserting hollow filler blocks or sections 2' such as indicated in Fig. 6, the diameter and circumference of the mold may be increased sufficiently to allow casings of larger diameter to be vulcanized. The sections 2' are constructed similarly to the sections 2 and a detailed description and illustration thereof is therefore superfluous.

It may here be stated that we intend to use the mold herein described and claimed, in connection with a suitable core and sand bag for holding the casing in case throughout the vulcanizing operation, but since the sand bag and core are disclosed fully in our co-pending application, Serial No. 236,844, filed May 27, 1918, they have been omitted from the present case.

From the foregoing, taken in connection with the accompanying drawing, it will be obvious that although we have provided a vulcanizing mold which is of comparatively simple and inexpensive nature, the same will be highly efficient and in every way desirable. Since probably the best results are obtained from the details shown and described, they are preferably followed, but within the scope of the invention as claimed, considerable latitude is allowed for making such minor changes as occasion may dictate.

We claim:

1. A tire vulcanizing mold comprising a plurality of hollow arcuate sections releasably connected end to end, means for supplying a heating medium to one of said sections, and nipples fixedly carried by said sections for establishing communication between them, each nipple being removably received in an opening in the end of the next adjacent section.

2. A tire vulcanizing mold comprising a plurality of hollow arcuate sections disposed end to end, means for supplying a heating medium to one of said sections, nipples fixedly carried by said sections for establishing communication between them, each nipple being removably received in an opening in the end of the next adjacent section, lugs extending laterally from the ends of said sections, and bolts passing through said lugs to releasably connect the several sections.

3. In an apparatus as described, a complete circle formed of hollow blocks, means for supplying a heating medium to the interior of said blocks, and interfitting plug and socket connections between the blocks for conducting the heating medium from one to another.

4. In a tire vulcanizing mold, a hollow ring disposed in substantially a horizontal plane and channeled on its inner periphery to receive the tire tread, said ring being formed of arcuate sections disposed end to end, means for supplying steam to one of said sections, and nipples connecting said sections and establishing communication between them, the bottom walls of said sections being inclined downwardly from the tire channel to conduct water of condensation away from the latter, and the aforesaid nipples being disposed immediately above the outer peripheral edges of said inclined bottom walls.

In testimony whereof we have hereunto set our hands.

FRED E. ANDERSON.
DAVID S. ERICKSON.

Copies of this patent may be obtained for five cents each, by addressing the "Commissioner of Patents, Washington, D. C."